United States Patent
Wolman et al.

(10) Patent No.: US 9,660,999 B2
(45) Date of Patent: May 23, 2017

(54) DISCOVERY AND CONNECTION TO A SERVICE CONTROLLER

(71) Applicant: Microsoft Technology Licensing, LLC, Redmond, WA (US)

(72) Inventors: Alastair Wolman, Seattle, WA (US); Sasa Junuzovic, Kirkland, WA (US); Anoop Gupta, Woodinville, WA (US); Barry Bond, Redmond, WA (US); Paramvir Bahl, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 158 days.

(21) Appl. No.: 14/615,907

(22) Filed: Feb. 6, 2015

(65) Prior Publication Data

US 2016/0234220 A1   Aug. 11, 2016

(51) Int. Cl.
| | |
|---|---|
| G06F 21/00 | (2013.01) |
| H04L 29/06 | (2006.01) |
| G06F 21/42 | (2013.01) |
| G06F 21/30 | (2013.01) |
| H04W 12/06 | (2009.01) |

(Continued)

(52) U.S. Cl.
CPC .......... H04L 63/102 (2013.01); G06F 21/30 (2013.01); G06F 21/42 (2013.01); H04L 63/08 (2013.01); H04L 63/083 (2013.01); H04W 12/06 (2013.01); H04W 12/08 (2013.01);
(Continued)

(58) Field of Classification Search
CPC .......... G06F 21/30; G06F 21/31; G06F 21/34; G06F 21/35; G06F 21/36; G06F 21/42; G06F 21/43
See application file for complete search history.

(56) References Cited

U.S. PATENT DOCUMENTS

| 5,872,523 A | 2/1999 | Dellaverson et al. |
|---|---|---|
| 7,436,300 B2 | 10/2008 | Glass et al. |

(Continued)

FOREIGN PATENT DOCUMENTS

| EP | 2011276 A1 | 1/2009 |
|---|---|---|
| WO | 2012100114 A2 | 7/2012 |
| WO | 2013175049 A1 | 11/2013 |

OTHER PUBLICATIONS

"International Search Report Issued in PCT Application No. PCT/US2016/015492", Mailed Date: May 9, 2016, 11 Pages.

(Continued)

*Primary Examiner* — Edward Zee
(74) *Attorney, Agent, or Firm* — International IP Law Group, PLLC

(57) ABSTRACT

The claimed subject matter includes techniques for discovering to and connecting to a service controller. The claimed subject matter may disclose a processor and a memory of a service controller to store connection information, an access credential, and an access credential hash. A beacon broadcaster to broadcast the connection information and the access credential hash to a client device, may also be disclosed. The present disclosure may also include an access credential director to send the access credential to an out-of-band communicator. The present disclosure may also include a client connector to receive a connection request from the client device and allow access to a client device based on the client device's use of the connection information.

21 Claims, 7 Drawing Sheets

(51) Int. Cl.
H04W 48/10 (2009.01)
H04W 12/08 (2009.01)
H04M 3/56 (2006.01)

(52) U.S. Cl.
CPC ............ *H04W 48/10* (2013.01); *H04L 63/18* (2013.01); *H04M 3/567* (2013.01)

(56) References Cited

U.S. PATENT DOCUMENTS

| | | | |
|---|---|---|---|
| 8,224,351 | B1 | 7/2012 | Sushkov et al. |
| 8,509,159 | B2 | 8/2013 | Shao et al. |
| 8,666,313 | B2 | 3/2014 | Preston et al. |
| 8,705,782 | B2 | 4/2014 | Woods et al. |
| 8,743,766 | B2 | 6/2014 | Barber |
| 8,806,027 | B2 | 8/2014 | Abanami et al. |
| 8,823,494 | B1 | 9/2014 | Kovitz et al. |
| 8,958,354 | B2 | 2/2015 | Das et al. |
| 2005/0108009 | A1 | 5/2005 | Lee et al. |
| 2006/0251256 | A1 | 11/2006 | Asokan et al. |
| 2007/0242643 | A1 | 10/2007 | Chandra et al. |
| 2009/0138712 | A1 | 5/2009 | Driscoll |
| 2010/0115108 | A1 | 5/2010 | Wang et al. |
| 2010/0227549 | A1 | 9/2010 | Kozlay |
| 2010/0268540 | A1 | 10/2010 | Arsh et al. |
| 2010/0281261 | A1 | 11/2010 | Razzell |
| 2012/0252405 | A1* | 10/2012 | Lortz ............... G06F 8/60 455/410 |
| 2012/0290689 | A1 | 11/2012 | Beguelin et al. |
| 2013/0029712 | A1 | 1/2013 | Shao et al. |
| 2013/0106977 | A1 | 5/2013 | Chu et al. |
| 2013/0242706 | A1 | 9/2013 | Newsome, Jr. |
| 2013/0267176 | A1 | 10/2013 | Hertel et al. |
| 2013/0329894 | A1 | 12/2013 | Krishnaswamy et al. |
| 2014/0075525 | A1 | 3/2014 | Ferlin |
| 2014/0120837 | A1 | 5/2014 | Abiri |
| 2014/0219261 | A1 | 8/2014 | Johnsson |
| 2014/0233755 | A1 | 8/2014 | Kim et al. |
| 2014/0280983 | A1 | 9/2014 | Paluch et al. |
| 2015/0026580 | A1 | 1/2015 | Kang et al. |
| 2015/0106887 | A1 | 4/2015 | Aslund |
| 2015/0312394 | A1 | 10/2015 | Mirza et al. |
| 2016/0050565 | A1* | 2/2016 | Benoit ............ H04W 12/06 726/9 |
| 2016/0227397 | A1 | 8/2016 | Colby et al. |

OTHER PUBLICATIONS

"International Search Report Issued in PCT Application No. PCT/US2016/015868", Mailed Date: May 9, 2016, 12 Pages.

Arrington et al., "Enhancing Security and Usability for Bluetooth Discovery and Pairing", In INFS 612 Final Report, Retrieved on: Sep. 15, 2014, 14 pages.

Lin et al., "SPATE: Small-group PKI-less Authenticated Trust Establishment", In Proceedings of the 7th International Conference on Mobile Systems, Applications, and Services, Jun. 22, 2009, 14 pages.

Miller et al., "Discovery and Pairing Literature Review for MediaScape", Retrieved on: Sep. 15, 2014 Available at: https://github.com/bbcrd/device-discovery-pairing/blob/master/document.md.

"Google ChromeBox for Meetings", Retrieved on: Sep. 19, 2014 Available at: https://www.google.com/chrome/business/solutions/for-meetings.html#overview.

"Crestron SmartSpace", Retrieved on: Sep. 19, 2014 Available at: https://www.google.com/chrome/business/solutions/for-meetings.html#overview.

"Second Written Opinion Issued in PCT Application No. PCT/US2016/015868", Mailed Date: Jul. 18, 2016, 5 Pages.

Sun, et al., "Spartacus: Spatially-Aware Interaction for Mobile Devices Through Energy-Efficient Audio Sensing", In Proceedings of 11th International Conference on Mobile Systems, Applications, and Services, Jun. 25, 2013, 14 pages.

"Spontaneous Secure Device Interaction", Retrieved on: May 18, 2015, Available at: http://www.stephansigg.de/stephan/projects_security.html.

Goodrich, et al., "Using Audio in Secure Device Pairing", In International Journal of Security and Networks, vol. 4, No. 1/2, Jan. 2009, 12 pages.

Sigg, et al., "AdhocPairing: Spontaneous Audio Based Secure Device Pairing for Android Mobile Devices", In Proceedings of Fourth International Workshop on Security and Privacy in Spontaneous Interaction and Mobile Phone Use, Jun. 18, 2012, 6 pages.

Lazik, et al., "Ultrasonic Time Synchronization and Ranging on Smartphones", In Proceedings of IEEE Real-Time and Embedded Technology and Applications Symposium, Apr. 13, 2015, pp. 108-117.

U.S. Appl. No. 14/615,907, Junuzovic, et al., "Discovery and Connection to a Service Controller", Filed Date: Feb. 6, 2015.

Nandakumar, et al., "Dhwani: Secure Peer-to-Peer Acoustic NFC", In Proceedings of ACM SIGCOMM Conference, Aug. 12, 2013, pp. 63-74.

"SmartPairings Technology: Innovators Spotlight", Retrieved on: Jun. 1, 2015 Available at: http://www.polycom.com/content/www/en/video-collaboration/innovations/smartpairing.html.

Tarantola, Andrew, "Chromecast Is Getting a Slew of Awesome New Features", Published on: Jun. 25, 2014 Available at: http://gizmodo.com/chromecast-gets-a-slew-of-extra-apps-and-an-awesome-new-1595869127.

"New Furby 2012—Overview", Published on: Aug. 2, 2012 Available at: https://www.youtube.com/watch?v=IAZ8QG8uz9I.

Ulanoff, Lance, "Researchers use Sound Waves to Control iPhones", Published on: Apr. 21, 2015 Available at: http://mashable.com/2015/04/20/sound-waves-control-iphone/.

Written Opinion of the International Preliminary Examining Authority for PCT Application No. PCT/US2016/015492 mailed Jun. 8, 2016, 4 pages.

Non-Final Office Action Issued for U.S. Appl. No. 14/875,298, Mail Date: Jan. 5, 2017, 23 pages.

* cited by examiner

300

400

500

600

DISCOVERY AND CONNECTION TO A SERVICE CONTROLLER

BACKGROUND

When a person is presenting information, connecting to a device, or collaborating on projects in a meeting, a computer device may be used to aid in discovery, connection, as well as presenting and collaborating with other people.

SUMMARY

This summary is not an extensive overview of the claimed subject matter. It is intended to neither identify key elements of the claimed subject matter nor delineate the scope of the claimed subject matter. Its sole purpose is to present some concepts of the claimed subject matter in a simplified form as a prelude to the more detailed description that is presented later.

An implementation provides a service controller device that aids in client device discovery and connection by broadcasting a beacon through a beacon broadcaster. The service controller has stored configuration information that may be used by a client device to connect to the service controller and this connection information is broadcast in the beacon as well as an access credential hash which may be used by the client device to confirm access rights and also to aid in identifying the service controller. This connection information and access credential hash may be received by the client device and stored. The service controller also includes an access credential director to send the access credential to an out-of-band communicator. At the out-of-band communicator the access credential may be communicated to, and received by, a user. The user may then input the access credential into the client device to be matched to the access credential hash. The service controller further includes a client connector to allow a client device to access the service controller based on the connection information, where the connection information may be identified based on the matching of an access credential to the access credential hash.

Another implementation provides a method for enabling discovery of and connection to a service controller including broadcasting connection information and an access credential hash stored in a service controller from the service controller. The method further includes communicating an access credential with an out-of-band communicator where the access credential may be received by a user and may be input into the client device to be matched to the access credential hash. The method also includes allowing the client device to access the service controller based on the connection information, where the connection information may be identified based on the matching of an access credential to the access credential hash.

Another implementation provides a system to enable discovery and connection to a service controller including an out-of-band communicator and a service controller communicably connected to the out-of-band communicator. In this system the service controller further includes a beacon broadcaster to broadcast connection information and an access credential hash. The service controller also includes an access credential director to direct an access credential to the out-of-band communicator where the access credential may be received by a user and may be input into the client device to be matched to the access credential hash. The service controller of the system also includes a client connector to allow a client device to access the service controller based on the connection information, where the connection information is identified based on the matching of an access credential to the access credential hash.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 7:
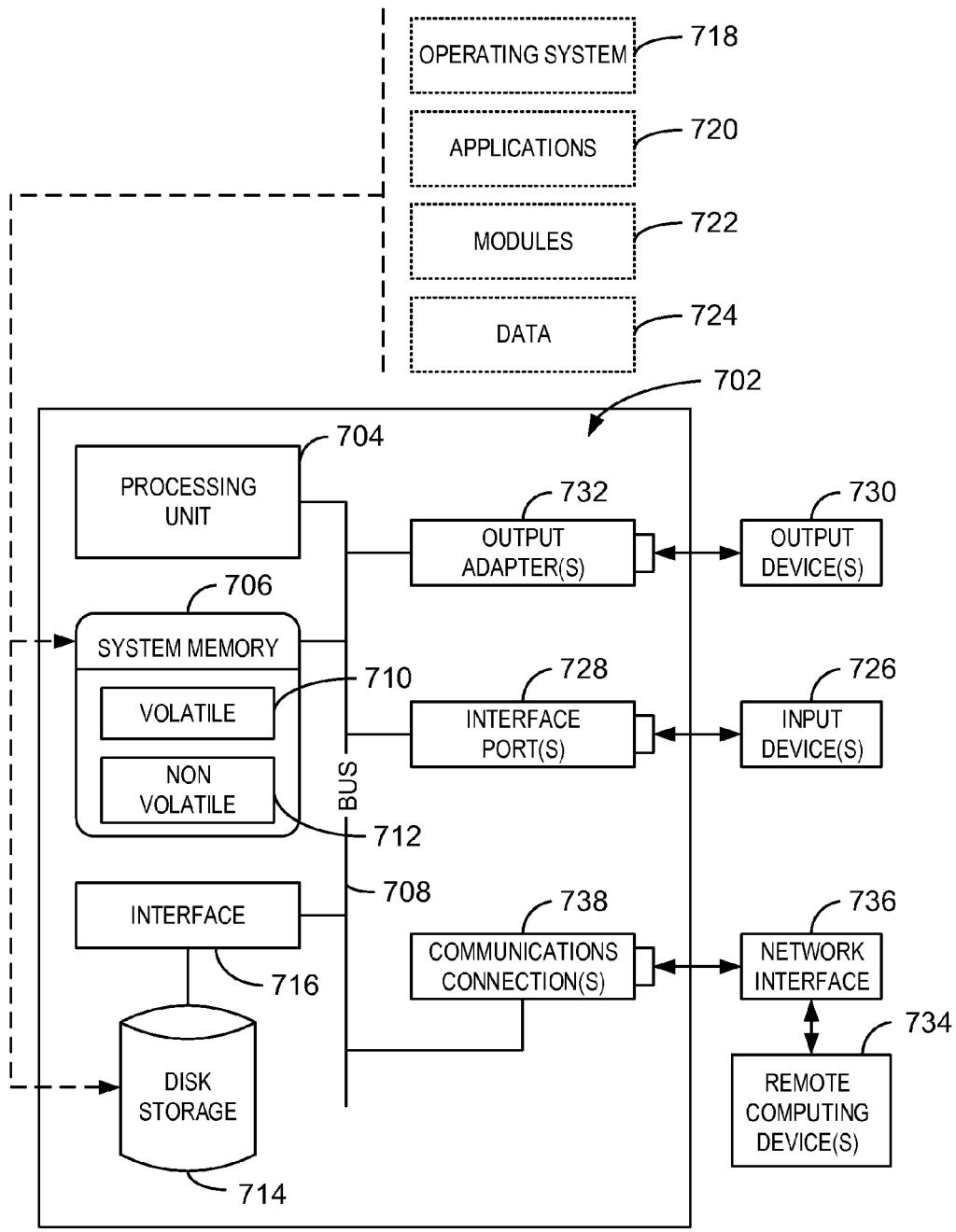
FIG. 7 is a block diagram of an example operating environment configured for implementing various aspects of the techniques described herein.

As a preliminary matter, some of the figures describe concepts in the context of one or more structural components, variously referred to as functionality, modules, features, elements, or the like. The various components shown in the figures can be implemented in any manner, such as software, hardware, firmware, or combinations thereof. In some cases, various components shown in the figures may reflect the use of corresponding components in an actual implementation. In other cases, any single component illustrated in the figures may be implemented by a number of actual components. The depiction of any two or more separate components in the figures may reflect different functions performed by a single actual component. FIG. 7 for example, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include computer systems, discrete logic components, such as application specific integrated circuits (ASICs), or the like.

As to terminology, the phrase "configured to" encompasses any way that any kind of functionality can be constructed to perform an identified operation. The functionality can be configured to perform an operation using, for instance, software, hardware, firmware, or the like. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may include communication media such as transmission media for wireless signals and the like.

The following describes techniques for connecting to a service controller. The service controller may be a computing device, or incorporated as a component in another computing device. The service controller can manage connections of multiple client devices and can manage the display of content from one or several of the client devices. The service controller may interface with the display and allow a client device to display content on the display. The service controller may further control access to the display, the content being displayed, or both via connection information identified by matching an access credential to a received access credential hash. The access credential hash which may be used by the client device to confirm access rights and also to aid in identifying the service controller. The access credential may be specific to a particular time, meeting, or service. The access credential may be communicated out-of-band such that the access credential is not communicated in the same channels used for transmitting content for display or interaction. The access credential hash may also include calculating a secure hash function (such as SHA-256) over the clear text of the access credential. A display connected to the service controller may be used to display the access credential so that a user operating a client device can obtain the access credential visually. In some examples, the service controller may be a meeting controller to manage several computing devices from a number of users who may be in the same room, or presenting on a similar display such that they all may discover and connect to the service controller for the service.

The following further describes example implementations such as embedding an out-of-band security token as one form of an access credential into a wireless broadcast message generated from the service controller to automate the discovery and matching process. The security token may then be used by the client device to identify or match the service controller offering the desired service. Further the service controller may also embed network connection information into a wireless broadcast message to enable automation of the connection process once the target device has been selected by providing an ordered list of network connections for a client device to follow. As the service controller may itself be connected to directly, a direct connection to a client device may be an option listed in the ordered list of network connections for a client device.

Figure 1:
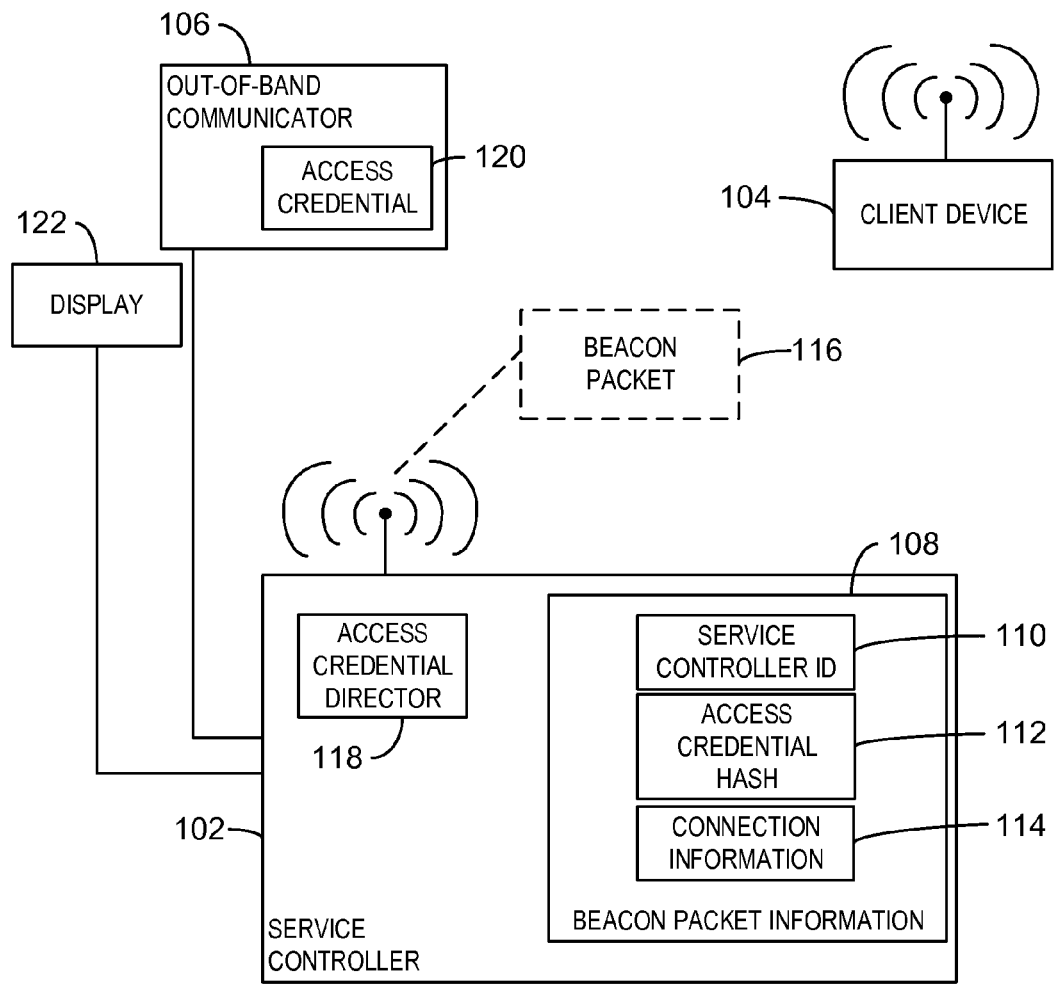
FIG. 1 is a block diagram of an example system of a service controller device enabling the automated connection of a client device.

FIG. 1 is a block diagram of an example system 100 of a service controller device 102 enabling the automated connection of a client device 104. The client device 104 may be any computing device able to communicate wirelessly with the service controller 102. It is noted however, that other means of communication, including wired communication, may be used between the client device 104 and the service controller 102. For example, the client device 104 may be a laptop computer, desktop computer, tablet computer, or a smart phone, among others. The service controller 102 may also be connected to an out-of-band communicator 106 that communicates access information that will enable the client device 104 to access a particular service controller 102. In some examples, the out-of-band communicator 106 may be a display that is visible to a user operating the client device 104. The service controller 102 may store beacon packet information 108.

Generally, the techniques herein discuss, in part, the secure and seamless connection of clients to service controllers. The beacon packet information 108 if received by a client device 104, when paired with information received from the out-of-band communicator 106, may be used to discover or identify a specific service controller 102 a user may wish to connect to. Further, once identified, the received beacon packet information 108 may additionally have information to enable the client device 104 to connect to the service controller 106 such as a specific network IP address. In some examples, this enables a client device 104 to connect to a service controller 102 without any additional requests for that information to connect.

More specifically, the beacon packet information 108 may include a service controller ID 108, a hash 112, and connection information 114. As seen in FIG. 1, this beacon packet information may be broadcast by the service controller 102 in the form of a beacon packet 116. The service controller 102 can broadcast the beacon packet 116 at any suitable frequency, for examples, 1 millisecond, 10 milliseconds, 30 milliseconds, 100 milliseconds, or more. The beacon packet 116 may be received by a client device 104 that is within a range that is needed by the connection means in order to receive the beacon packet 116. In some examples, the receipt of the beacon packet 116 received by a client device 104 also includes the beacon packet information 108.

The service controller 102 may also include an access credential director 118. The access credential director 118 may direct the out of band communicator 106 to communicate an access credential 120. In some examples, the access credential may be a security token such as randomly chosen number similar to a personal identification number (PIN). In some examples, the access credential may be a pictographic identifier including an image or a Quick Response Code (QR Code). In some examples, the communication of the access credential via the out-of-band communicator 106 may be detected by the client device 104 or a user operating the client device 104. For example, if the out-of-band communicator 106 is a display, and the access credential 120 is communicated by projection of the access credential 120 on a screen, a user operating the client device 104 may observe the access credential 120 by seeing the access credential 120. The user may input any observed access credential 120 into the client device 104 to enable the client device 104 to connect to a service controller 102. In some examples, the client device 104 may capture the access credential 120 itself without intervention of the user, for example, by capturing an image or QR code with a camera. In other examples the access credential may be communicated through an audio signal or ultrasound audio signal as described more fully below.

In some examples, the client device 104 receiving the beacon packet information 108 conveyed by the beacon packet 116 and the access credential 120 communicated by an out-of-band communicator are both used to enable connection to the service controller 102. For example, a client device 104 may have received from the beacon packet 116, the service controller ID 110, the access credential hash 112, and the connection information 114. In some examples, the service controller ID 110 is a naming convention specific to the controller ID that is in a standardized format such that the format could be used by the client to categorize the beacon packet 116 as originating from a service controller 102 or a particular service controller 102 service rather than any other signal generating device. The service controller ID 110 may also be used by the client device 104 as a naming convention that may be displayed to a user. In some examples, the service controller may include a wireless networking adaptor. This may include a Wi-Fi adaptor, or any other suitable wireless communication technology. In some examples where multiple wireless communication radios exist, then a service controller 102 my send beacons on all of them simultaneously. In examples where there are a plurality of service controllers, each service controller 102 may create a specific Wi-Fi service set identifier (SSID) and broadcast beacon packets periodically. In some examples, the SSID name is used to identify a specific service being offered by the service controller.

A client device 104 may also have received the access credential hash 112 as part of the beacon packet information 108 originally stored in the service controller 102. As discussed more generally above, the access credential hash 112 and the access credential 120 may be paired together or matched. In some embodiments, the access credential 120 may be hashed by a client and exactly match the access credential hash 112. A client 102 may use the hashed access credential to find a matching access credential hash 112 from a plurality of stored access credentials hashes 112. Each access credential hash 112 may be associated with a specific client device 104. When a client 102 has found the matching hash, the client may identify the service controller 102 that sent that access credential hash 112 as the particular service controller 102 to connect to. Accordingly, in order to ensure matching, the access credential hash 112 and the access credential 120 may be generated by the same service controller 102 in order to ensure later matching by the client 102.

The connection information 114 that may have been received at the client device in a beacon packet 116 may provide information to a client device 104 that enables the client device to connect to the service controller 102. In some embodiments, the connection to a service controller 102 could include connection through a network such as the internet, a local-area network, a wireless network, or through directly connecting to the service controller. In some embodiments, the connection information 114 may include the names and addresses of networks the service controller 102 is connected to or may also include the name and address of the service controller 102. In some examples, the address may include an internet protocol address, or any other address following a logical address or digital address protocol. In some examples, the beacon packet could contain the service controller ID and the network connection information to allow connection independent of an access credential. This may be accomplished by the embedding of network connection information in the beacon packet. This information may be used by a client device 104 to connect to a service controller 102. Further, when there is connection information for multiple networks, this information may be held in a prioritized list, so that the client device can attempt to connect in the order specified by the list.

The system 100 may also include a display 122 to display content a client device 104 may wish to present or show. In some examples the display 122 may be the same as the out of band communicator 106, however in other examples, the two are different and the access credential 120 is not displayed on a display 122, but instead communicated through another out-of-bands means such as the out-of-band communicator 106 previously discussed.

Figure 2:
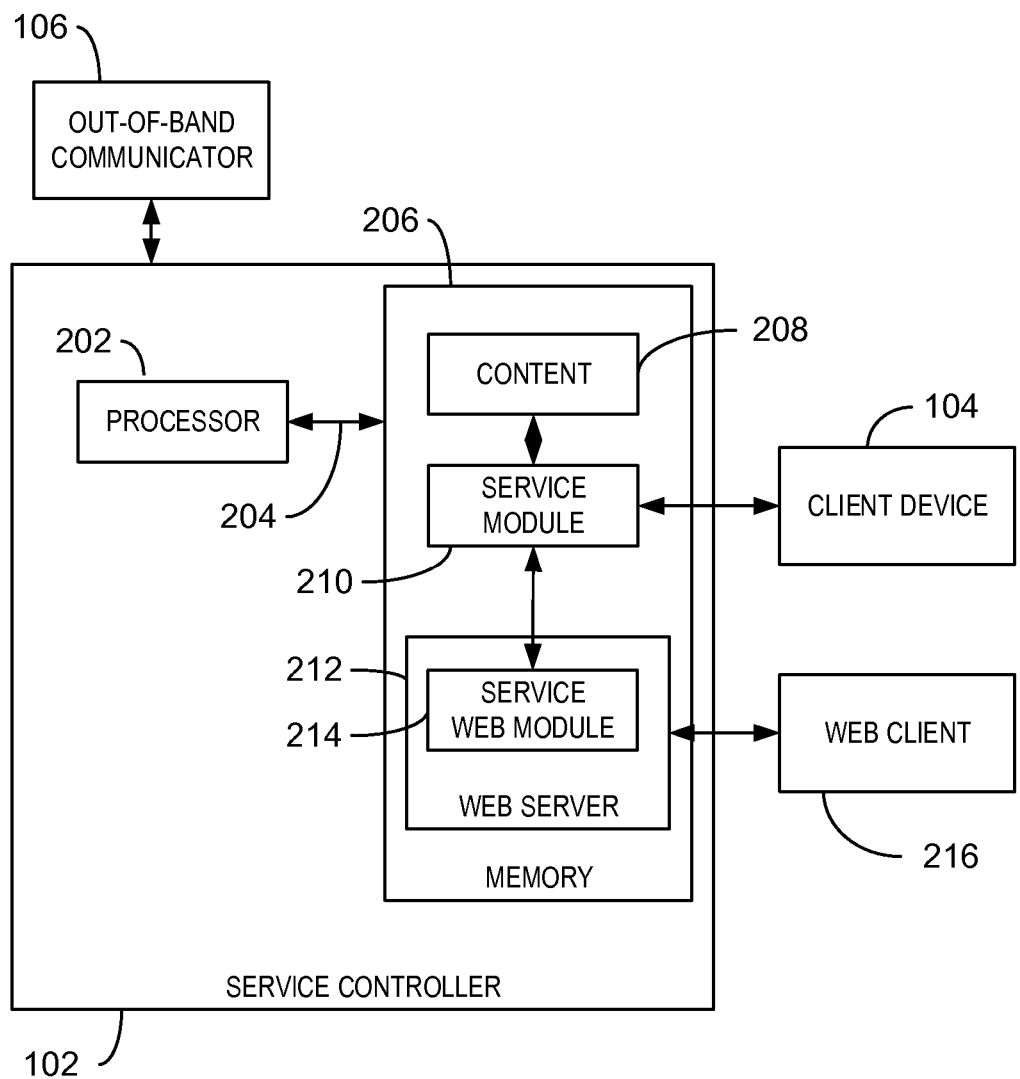
FIG. 2 is a block diagram of an example system of a service controller device and out-of-band communicator.

FIG. 2 is a block diagram of an example system 200 of a service controller device 102 and out-of-band communicator 106. Like numbered items are as described above in FIG. 1. As shown in FIG. 2, a processor 202 may be included within the service controller 102 and connected by a bus 204 to a memory 206. The processor 202 may be used to process instructions provided it to it from the memory 206. The bus 204 can be any of several types of bus structures, including a memory bus or memory controller, a peripheral bus or external bus, and a bus using any variety of available bus architectures known to those of ordinary skill in the art. The memory 206 may include volatile memory and nonvolatile memory.

In some examples, the memory 206 may store content 208 and a service module 210. The content 208 may be any data to be accessed on the service controller 102. As discussed above, the service controller 102 may be a meeting controller for multiple individuals with a number of devices. The content 208 may include slide based presentations, static images, videos, interactive designs, text documents, or any other type of data for display, projection, or sharing. The content 208 may have been already stored on the service controller 102 or may have been transferred to the service controller 102 by a connected or previously connected client device 104. A client device 104 that is connected to a service controller 102 may have access to a service module 210. The service module 210 may provide the client device 104 the ability to transmit, alter, view, or copy the content 208 that may be stored on the memory 206 of the service controller 102. The service controller 102 also may regulate the connections of the client device 104 by implementing a method of connection more fully discussed in FIG. 3 with the techniques and embodiments shown in FIG. 1. Although one client device 104 is shown as connecting to the service module 210, in some embodiments, many other client devices 104 may also connect to the service module 210 and thereby also gain access to the content 206 stored on the memory 206 of the service controller 102. Further, this service module may control the display of any content 208 stored on the memory 206 of the service controller 102 by transmitting certain content 208 to the out-of-band communicator 106 or another communicating device such as a television or computer monitor.

The memory 206 of the service controller 102 may further store a web server 212 which may include a service web module 214 for interfacing with web clients 216. The web server 212 may enable the connection of web clients 216 to the service controller 102. In some examples, the web clients 216 are not connected directly to the service controller 102, but instead connected through an intermediate network such as the internet, including the protocols covered by the conventions of the World Wide Web. The Web server 212 can include a service web module 214 that may manage the connections of each connecting web client 216 and may also interface with the service module 210 to allow communication between a web client 216, a client device 104, and a service controller 102. When a web client 216 is connected to the web server 212, the service web module 214 may be used to interact with the service module 210 to perform all of the actions discussed relating to the service module 210 above.

Figure 3:
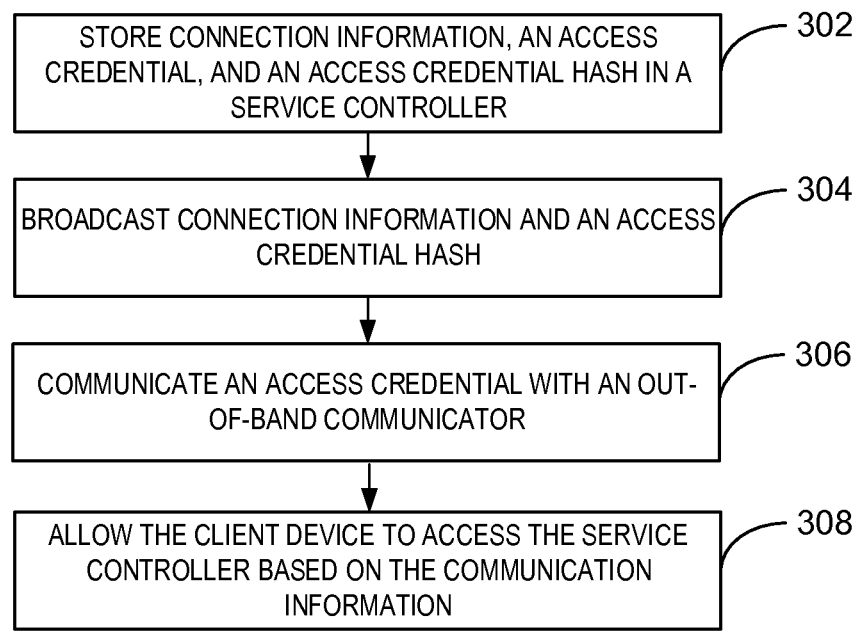
FIG. 3 is a process flow diagram of an example simplified method for connecting to a service controller.

FIG. 3 is a process flow diagram of an example simplified method 300 for connecting to a service controller 102. In some examples, various aspects of the method may be performed in a service controller 102 or other computing systems discussed herein. The method 300 may begin at block 302. Like numbered elements are as described in the description of FIG. 1.

At block 302, connection information 114, an access credential 120, and an access credential hash 112 may be stored in memory of a service controller 102. The memory of the service controller 102 may be accessible to implement the discovery and connection to the service controller 102 as described in the following steps.

At block 304, connection information 114 and an access credential hash 112 may be broadcast. In some embodiments, both the connection information 114 and the access credential 112 may be broadcast as a broadcast packet 116. For example, if being broadcast over Wi-Fi, each service controller 102, or a separate server within the service controller 102 may create a unique Wi-Fi service set identifier (SSID), and broadcast a beacon packet 116 periodically. In some examples, an SSID name is used to identify a specific service being offered by the service controller 102. Although one implementation implements one service per service controller 102, other examples could implement multiple services per service controller 102, through the use of multiple servers. If implementing multiples services in a service controller 102, the service controller 102 may use multiple Wi-Fi SSIDs to advertise these services. To embed an access credential 120, as well as the connection information 116, the service controller 102 may use an information element within a 802.11 beacon message. In some examples, this information element could be the Proximity Service Discovery Information Element field of a Wi-Fi beacon. Using an operating system, some examples allow the use of an API to enable encoding custom information into this example information element of the Wi-Fi beacon.

In some examples, service controllers 102 may use a wireless broadcast feature of the Bluetooth Generic Access Profile (GAP) to advertise service controller services over Bluetooth. In some examples, the advertising data payload may be used to announce the presence of a service controller service running on a service controller 102. If the embedded broadcast packet information 108, including the access credential hash 120 and the connection information 114, fits within the 37 bytes of a single Bluetooth advertisement, then an ADV_NONCONN_IND message type may be used. If not, then the message type may be set to ADV_DISCOVER_IND, and the additional data may be sent using a Scan Response payload.

At block 306, an access credential 120 is communicated with an out-of-band communicator 106. In some embodiments, the out of band communicator 106 may communicate the access credential 120 as directed by the access credential director 118 located in the service controller 102. In some examples, a personal identification number (PIN), such as a 4 digit or 6 digit alphanumeric string, may be used as an access credential to be received over the out-of-band channel by a client device 104 and used by the client device 104 to match to an access credential hash 112 as described in more detail in previous examples. The PIN may be displayed on a screen attached to the service controller, and a user may type the PIN into a client device 104. The client device 104 may then automatically perform the connection to the service controller 102 without further interaction from a user. Further, the service controller 102 may enable the automation of the process of deciding which Wi-Fi network, or other network, to connect to the service controller 102 through, for example. In some examples, the client may be automatically connecting to the service controller. The service controller 102 may also enable the automation of all other steps to make the connection. In some examples, this connection method adds a security benefit. Specifically as the connection method relies, in part, on a client device 104 or user receiving the access credential 120 from the out-of-band communicator 106, those users and client devices who are able to receive the access credential 120 may connect to the service controller. In some examples, this may take the form of limiting the connection to any client device 104 or user who can visually see the out-of-band communicator 106. In some examples, the user or client device 104 may be in the same room as the out-of-band communicator 106 in order to obtain the access credential 120 to connect to the service controller 102. Accordingly, this method discloses one way in which a security benefit is conferred.

In another example, transmitting an access credential 120 may include using an audio channel rather than the visual channel of a PIN. One advantage of audio is that a user may not be forced to read the PIN from a screen and then type that PIN into the client device 104. Instead, the entire process of discovery and connection may be performed without any direct user action and by nonvisible means. In this example, the service controller 102 may periodically generate an audio sound that encodes an access credential 120, and a client device may use a built-in microphone to listen for the access credential 120 from the service controller. This example may present an additional security feature present when using audio signals to convey an access credential 120. Specifically, some examples using audio to communicate the access credential 120 may be able to limit access to client devices 104 that can hear the access credential 120. In this example, connection to a service controller 102 may be limited to those within a certain distance limited by the range of the audio communication of the access credential 120. Further, when an access credential 120 is conveyed by audio signals, the user may not be forced to perform any action, such as typing a PIN. Thus, the access credential 120 can be much longer, for example, 100 digits instead of 6 digits. The longer access credential 120 may offer additional security benefits, such as protection against brute-force and/or dictionary attacks.

In some examples, the service controller 102 may be capable of communicating the access credential 120 through multiple means, including visual channels such as a displayed PIN and also by audible, ultrasound, near ultrasound or any other signal. In examples where multiple means for communicating an access credential 120 exist, a service controller 102 could use each means as a failsafe means to communicate the access credential if an initial means is not successful. For examples, a service controller 102 could try to use ultrasound to broadcast the access credential 120 first. If that fails, the service controller 102 could try audible sound. If that fails, the service controller 102 could use a visual channel to communicate the credentials either to the user who has to enter them manually or to a camera on the client device 104 which can capture them automatically.

In some examples, a client device 104 may also make use of failover procedures to establish a connection. In some cases, a client device 104 may try to use existing local area connections, then Bluetooth/NFC, then a cloud based connection, and then eventually fail over to the controller's own private network. In some examples, an additional useful failover mechanism may include that a service controller 102 with a first set of wireless communication capabilities and a client device 104 with a second set of wireless communication capabilities, the service controller 102 may first determine which, if any, communication means both the client device 104 and service controller 102 have in common and proceed to communicate through that connection method.

Another benefit conveyed by the above examples, includes the time that may be saved by a person organizing a service who no longer takes the time to email or convey an access credential 120 to each person attending. Instead attendees of a service may gain access, or connect to a service controller 120 merely by being present in the room to see or hear the access credential 120 as described above. Other alternatives may for be used for generating and delivering the access credential. For example, Near Field Communication (NFC) may be used to deliver the access credential, and in this case, a client device 104 seeking authorization may be within a very short distance from the NFC device that contains the access credential 120. Use of this NFC method for transferring an access credential 120 provides stronger proximity (i.e. a smaller distance) properties than other examples where an access credential 120 is communicated to an entire room.

In some examples, if the access credential 120 is received by a user or client device 104, it may be matched to an access credential hash 112 previously received by the client device 104. This matching may, in some examples, enable the client device 104 to associate the matched access credential hash 112 with the connection information 114 conveyed from the same service controller 102. Accordingly, if the access credential 120 matches to an access credential hash 112, the connection information 114 for a particular service controller may be identified.

At block 308, a client device 104 may be allowed to access a service controller 102 based on the connection information 114, wherein the connection information 114 may be identified based on the matching of an access credential 120 to the access credential hash 112 as discussed above. The connection information 120 may provide a digital address or logical address location to the client device 104 in order to allow the client device 104 to connect to the service controller 102. In some examples, the stored connection information 114 may include an internet protocol address, media access control (MAC) address, or any combination to be used by a client device 104. In some examples near field communication (NFC) could be used to communicate both an internet protocol address and a MAC address to establish a link. The identified connection information 114 may also indicate that a direct connection to the service controller 102 may be used instead.

This process flow diagram is not intended to indicate that the blocks of the method 300 are to be executed in any particular order, or that all of the blocks are to be included in every case. Further, any number of additional blocks not shown may be included within the method 300, depending on the details of the specific implementation.

Figure 4:
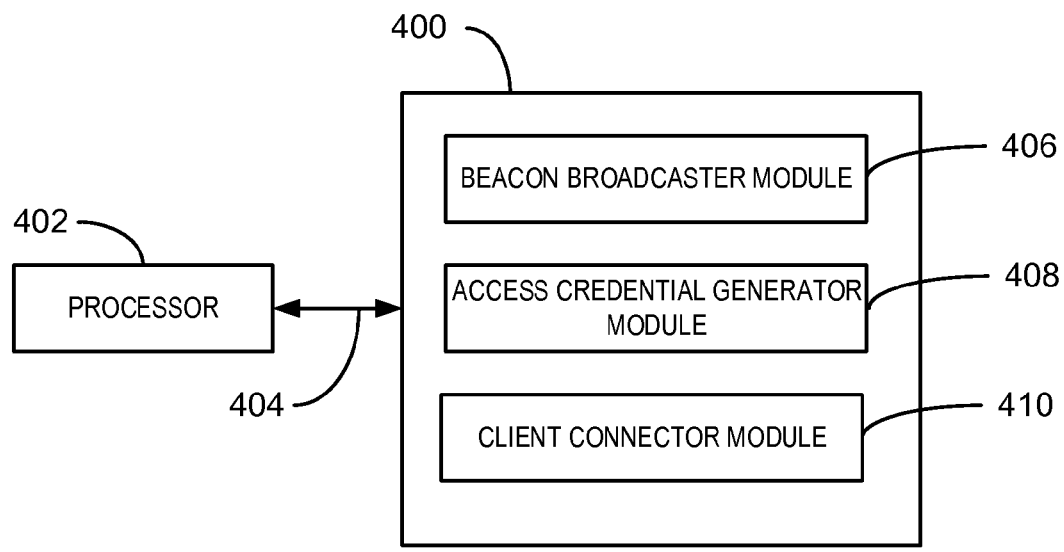
FIG. 4 is a block diagram showing a tangible, computer-readable storage medium that can be used to connect to a service controller.

FIG. 4 is a block diagram showing a tangible, non-transitory, computer-readable storage medium 400 that can be used to connect to a service controller. The tangible, computer-readable storage device 400 can be accessed by a processor 402 over a computer bus 404. Furthermore, the tangible, computerreadable storage device 400 can include code to direct the processor 402 to perform the current methods. For example, methods 300 can be performed by the processor 402.

The various software components discussed herein can be stored on the tangible, computer-readable storage device 400, as indicated in FIG. 4. For example, the tangible computer readable storage device 400 can include a beacon broadcaster module 406, an access credential generator module 408, and a client connector module 410.

In some implementations, the beacon broadcaster module 406 can include code to broadcast a beacon packet from a service controller 102. The broadcasting of a beacon may allow for surrounding devices, such as a client device 104 to discover the service controller 102. Also, in some embodiments, the beacon packet 116 may contain beacon packet information 108 which may, in part, enable a client device 104 to discover the service controller 102 and to also connect to it. Accordingly, in some examples, and as shown in FIG. 1, a beacon packet 116 may broadcast beacon packet information 108 which may include a service controller ID 110, an access credential hash 112, and connection information 114.

The access credential generator module 408 may be used to generate an access credential 120 which may be later communicated by an out-of-band communicator 106. Generation of the access credential 120 may, in some examples, affect the generation of the access credential hash 112. In some examples, it is the subsequent matching of the access credential 120 to the access credential hash 112 that allows a client device 104 to identify a desired service controller 102 to connect to. The connection of client devices 104 to a service controller 102 may be enabled, in part, by identifying the connection information 114 to the client device 104 through the matching of the access credential 120 to the access credential hash 114. The access credential generator 404 shown may also base the generation of the access credential 120 on a schedule or particular time schedule. In some examples, each time a new service is scheduled, the access credential generator module 408 may generate a new access credential 120 and access credential hash 112 for use by the service controller 102. In some cases, the service controller 102 may be used as a meeting service controller, and a new access credential 120 may be generated each time a meeting begins or ends. In other examples, a new access credential 120 may be periodically generated during a meeting to ensure that a client device 104 is not stay connected longer than it is intended to be. This may occur when a user of a client has left the room, and in that instance the user may not have the clearance or intention of seeing or hearing the newly generated access credential 120. In these cases, the service controller 102 may no longer support the connection of that particular client device 104.

The client connector module 410, may be used to direct an out-of-band communicator 106 to communicate the generated access credential 120. In some examples, it is the communication of the access credential 120 that allows a client device 104 to receive the access credential 120. The client device may use the access credential 120 to match to an access credential hash 114 and thereby identify a service controller 102 to connect to. The matching of the access credential 120 to the access credential hash 114 may also identify the connection information 114 associated with the particular service controller 102. With the particular connection information 114 identified, a client device may connect to the service controller 102. However, in some examples, the client device 104 may have accumulated a plurality of connection information sets 114. In these examples, the each connection information sets 114 may include the name and internet protocol address of networks or other connection points that enable a client device 104 to connect to the service controller 102. In other examples, connection information may include any combination of a domain name system (DNS) name, an IP address, a transmission control protocol (TCP) or user datagram protocol (UDP) port number, or a uniform resource locator (URL). The client connection module may select from this list of connection information sets 114 a connection route to connect the client device 104 to the service controller 120.

It is to be understood that any number of additional software components not shown in FIG. 4 can be included within the tangible, computer-readable storage device 400, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

Figure 5:
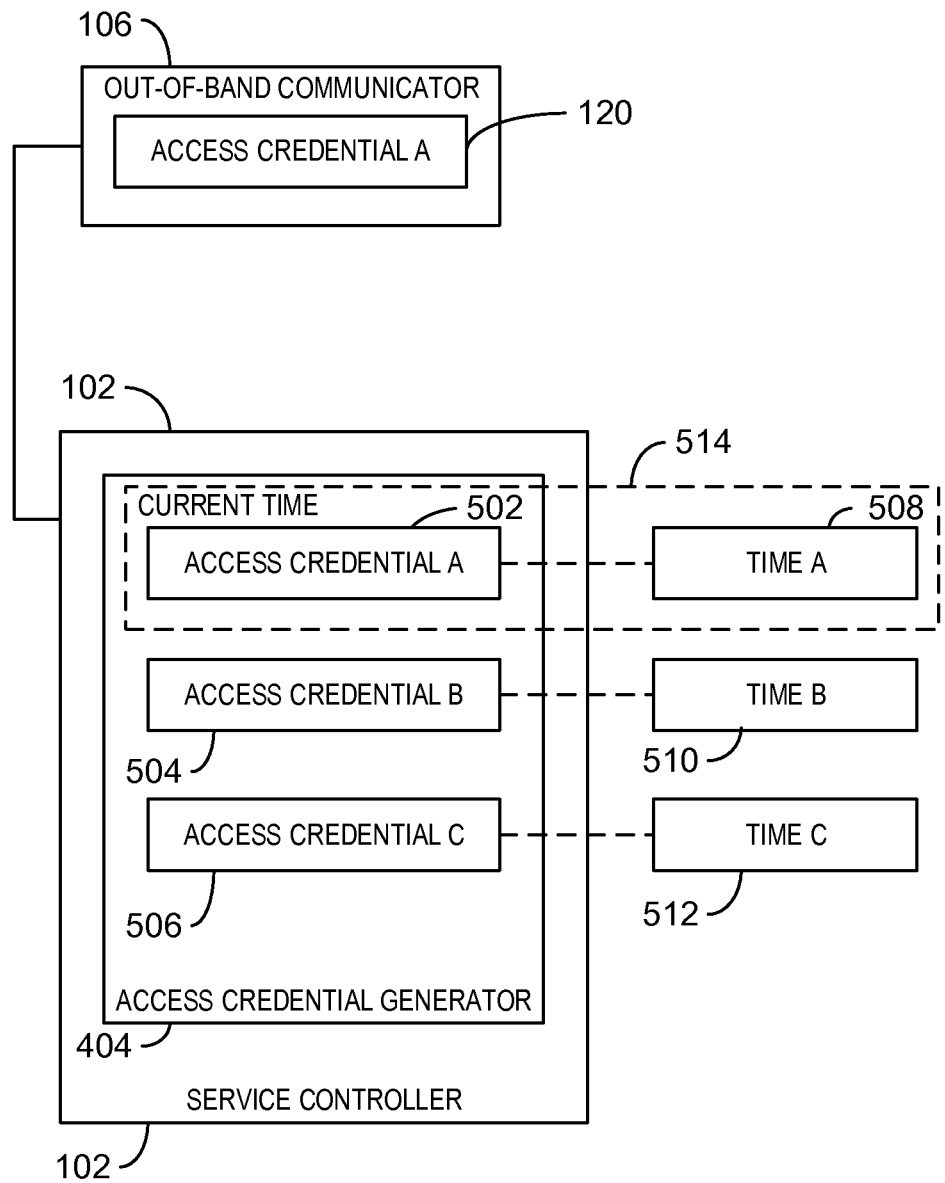
FIG. 5 is a block diagram of an example of a service controller showing an access credential generator.

FIG. 5 is a block diagram of an example 500 of a service controller 102 showing an access credential generator 404. Like numbered items are as described in FIGS. 1 and 4. In FIG. 5, the access credential generator 404 for a service controller 102 is shown in greater detail. Within the access credential generator 404 several access credentials have been generated including access credential A 502, access credential B 504, and access credential C 506. While in FIG. 5 each access credential 502, 504, 506 is shown simultaneously, in practice the access credentials may not be generated all at once. In some examples, each access credential 502, 504, 506 is shown to illustrate one aspect of the service controller's 102 management of access credentials 502, 504, 506. As seen in FIG. 5, each access credential 502, 504, 506 also pairs to a specific time, for example access credential A 502 is shown to correspond to Time A 508, access credential B 504 is shown to correspond to Time B 510, and access credential C 506 is shown to correspond to a Time C 512. The length and scheduling of each block of time 508, 510, 512 and its corresponding access credential 502, 504, 506 may be coordinated by the service controller 102 or may be imported from another device or system. The length of each access credential 502, 504, 506 may be, for example, based on a periodic schedule such that a new access credential 502, 504, 506 is generated hourly, daily, weekly, or similar periodic time frame. In some embodiments the access credential generator 404 may generate a new access credential 502, 504, 506 to correspond to a particular service that is scheduled. In some examples, access credential A 502 may be generated to correspond to a particular service schedule during time A 508. In other embodiments the access credential generator 404 may not generate the access credentials in a time dependent manner and may instead generate a new access credential in response to explicit instruction from the service controller 102. In some examples, the instruction to generate a new access credential may also be given, for example, anytime a user operates a control, such as a button, on the service controller 102 to indicate the user is requesting a new access credential be generated.

A current time 514 is shown to highlight how at a current time of use, the service controller 102 may instruct the out-of-band communicator 106 to communicate a particular access credential 120. In FIG. 5, for example, credential A 502 corresponds to time A 508 as the current time 514 includes time A 508. Accordingly, in this example, the out-of-band communicator 106 may be instructed to communicate access credential A 502 as the access credential 120. In some embodiments, the out-of-band communicator is a display and may display access credential A 502 when time A 508 is within the current time 514.

Figure 6:
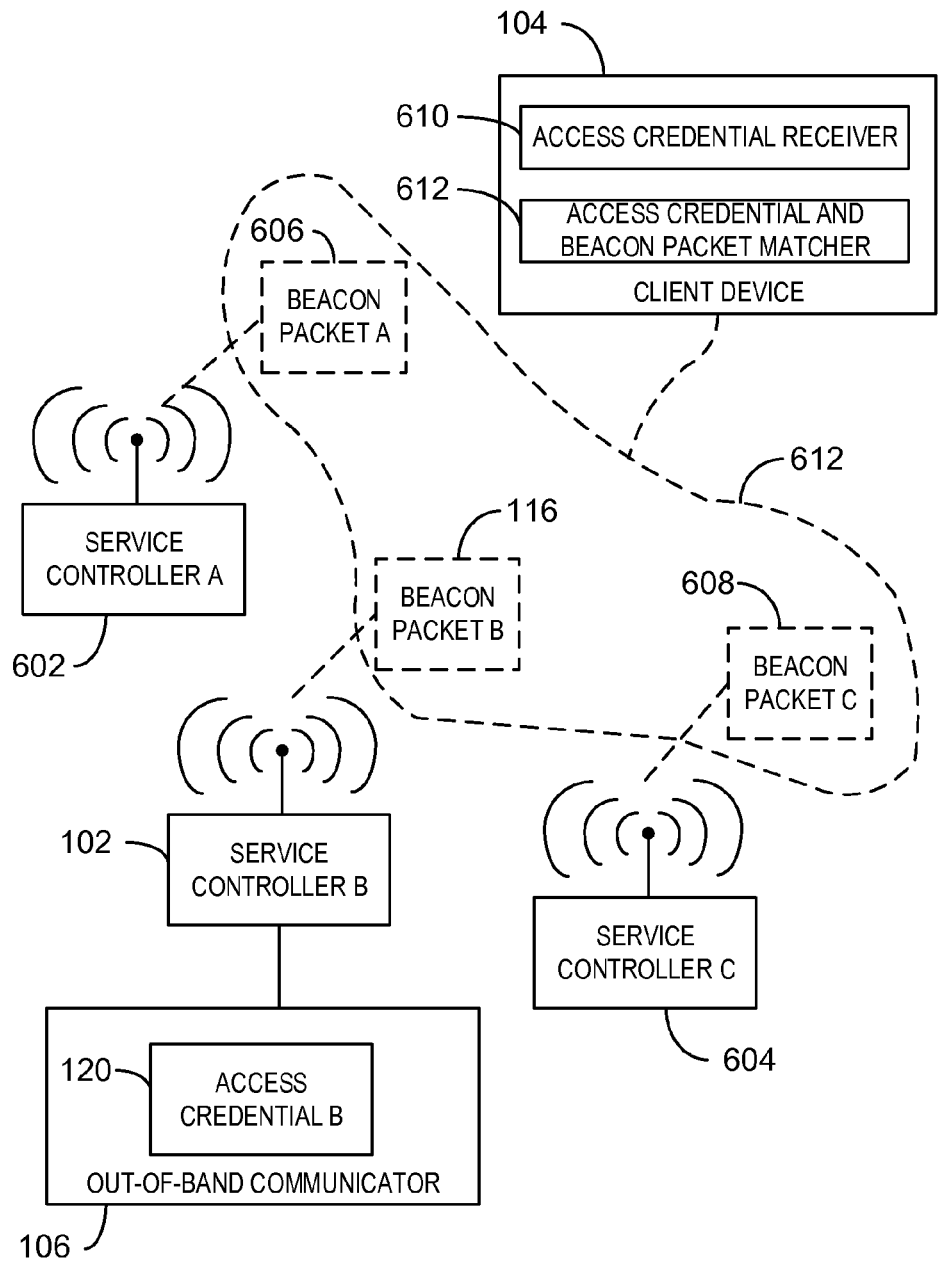
FIG. 6 is a block diagram of an example showing an interaction between several service controllers and a client device.

FIG. 6 is a block diagram of an example showing an interaction 600 between several service controllers and a client device 104. Like items shown are as described in FIG. 1. The example interaction shown here may highlight, in part, the matching feature that can be enabled by a service controller 102 broadcasting a beacon packet 116 and communicating an access credential 120.

A number of service controllers are shown in this interaction 600 including service controller A 602, service controller B 102, and service controller C 604. Each controller may be broadcasting its own beacon packet—service controller A 602 broadcasting beacon packet A 606, service controller B 102 broadcasting beacon packet B 116, and service controller C 604 broadcasting beacon packet C 608. Each bacon packet may include identifying information about its corresponding service controller. Each service controller may be broadcasting their corresponding packet in order to enable discovery and connection by a client device 104.

The client device 104 may include an access credential receiver 610 and an access credential and beacon packet matcher 612. Further, in some examples the client device 104 may be able to detect all beacon packets within a detection range 614 where the detection range may be a distance, receiving frequency range, or any other designation of what parameters a client device 104 may be able to detect. In some examples, a client device 104 may listen for wireless broadcast messages that announce the presence of services offered by a number of service controllers 102. By using wireless broadcast, any client device 104 within wireless range of a service controller 102 can discover the client device 104 by receiving the associated beacon packet 116 and then, after a matching process, decide to initiate a connection to the service controller 102.

Service controller B 102 may also be connected to an out-of-band communicator 106. The Service controller B 102 may instruct the out-of-band communicator 106 to communicate an access credential specific to the service controller 102, here the access credential is access credential B 120. A client device 104 may receive access credential B 120 with the access credential receiver 610. In some examples, if the out-of-band communicator 106 is a display, the communication may be through visual display and the access credential receiver 610 of the client device 104 may capture the display and identify the access credential B 120. In other examples, if the out-of-band communicator was a signal emitter such as a sound wave emitter, the access credential receiver 610 may be a microphone to detect receive and identify the access credential B 120. In some examples, the out-of-band communicator 106 is out-of-band as it does not communicate information through the same channel as the beacon packet 116 is broadcast or through a network used to connect a client device 104 to a service controller 102, such as the internet or an internal office computer network. In some examples, the client device 104 may store each of the beacon packets 606, 116, 608 received.

In some examples, after the access credential receiver 610 has received access credential B 120, the beacon packet matcher 612 may compare the access credential B 120 to each of the beacon packets within the detection range 614 of the client device 104. In some examples, the beacon packet B 116 may contain information, such as an access credential hash 112 that could be matched to the received access credential B 106. In some examples, this match may be found by the beacon packet matcher 612. Matching may include the client device 104 using the received access credential 120, or another security token, which was transmitted using an out-of-band communicator 106. In some examples, a client device 104 may then hash the access credential 120 to generate a hashed access credential 120 that will match to the access credential hash 112 received by the client device 104.

From this match, the client device 104 may be able to identify connection information 114 to connect to service controller B 102. Specifically, some examples show that the beacon packet B 116 may include connection information showing how to connect to service controller B 102. Accordingly, in some examples, when the client device 104 matches a received access credential B 120 to a beacon packet B 116, the client may use the connection information transmitted in beacon packet B to connect to the service controller 102 without further query or network searching. In other examples, the client device can identify both the service controller ID and the connection information from the match.

FIG. 7 is intended to provide a brief, general description of a computing environment in which the various techniques described herein may be implemented. For example, a method and system for connecting to a service controller can be implemented in such a computing environment. While the claimed subject matter has been described above in the general context of systems, devices, and methods, the claimed subject matter also may be implemented in combination with other program modules. Generally, program modules include routines, programs, components, data structures, or the like that perform particular tasks or implement particular abstract data types.

FIG. 7 is a block diagram of an example operating environment configured for implementing various aspects of the techniques described herein. The example operating environment 700 includes a computer 702. The computer 702 includes a processing unit 704, a system memory 706, and a system bus 708.

The system bus 708 couples system components including, but not limited to, the system memory 706 to the processing unit 704. The processing unit 704 can be any of various available processors. Dual microprocessors and other multiprocessor architectures also can be employed as the processing unit 704.

The system bus 708 can be any of several types of bus structure, including the memory bus or memory controller, a peripheral bus or external bus, and a local bus using any variety of available bus architectures known to those of ordinary skill in the art. The system memory 706 includes computer-readable storage media that includes volatile memory 710 and nonvolatile memory 712.

The basic input/output system (BIOS), containing the basic routines to transfer information between elements within the computer 702, such as during start-up, is stored in nonvolatile memory 712. By way of illustration, and not limitation, nonvolatile memory 712 can include read-only memory (ROM), programmable ROM (PROM), electrically programmable ROM (EPROM), electrically erasable programmable ROM (EEPROM), or flash memory.

Volatile memory 710 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 702 also includes other computer-readable media, such as removable/non-removable, volatile/nonvolatile computer storage media. FIG. 7 shows, for example a disk storage 714. Disk storage 714 includes, but is not limited to, devices like a magnetic disk drive, floppy disk drive, tape drive, Jaz drive, Zip drive, LS-210 drive, flash memory card, or memory stick.

In addition, disk storage 714 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 714 to the system bus 708, a removable or non-removable interface is typically used such as interface 716.

It is to be appreciated that FIG. 7 describes software that acts as an intermediary between users and the basic computer resources described in the suitable operating environment 700. Such software includes an operating system 718. Operating system 718, which can be stored on disk storage 714, acts to control and allocate resources of the computer 702.

System applications 720 take advantage of the management of resources by operating system 718 through program modules 722 and program data 724 stored either in system memory 706 or on disk storage 714. It is to be appreciated that the claimed subject matter can be implemented with various operating systems or combinations of operating systems.

A user enters commands or information into the computer 702 through input devices 726. Input devices 726 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, and the like. The input devices 726 connect to the processing unit 704 through the system bus 708 via interface ports 728. Interface ports 128 include, for example, a serial port, a parallel port, a game port, and a universal serial bus (USB).

Output devices 730 use some of the same type of ports as input devices 726. Thus, for example, a USB port may be used to provide input to the computer 702, and to output information from computer 702 to an output device 730.

Output adapter 732 is provided to illustrate that there are some output devices 730 like monitors, speakers, and printers, among other output devices 730, which are accessible via adapters. The output adapters 732 include, by way of illustration and not limitation, video and sound cards that provide a means of connection between the output device 730 and the system bus 708. It can be noted that other devices and systems of devices can provide both input and output capabilities such as remote computers 734.

The computer 702 can be a server hosting various software applications in a networked environment using logical connections to one or more remote computers, such as remote computers 734. The remote computers 734 may be client systems configured with web browsers, PC applications, mobile phone applications, and the like.

The remote computers 734 can be a personal computer, a server, a router, a network PC, a workstation, a microprocessor based appliance, a mobile phone, a peer device or other common network node and the like, and typically includes many or all of the elements described relative to the computer 702.

Remote computers 734 can be logically connected to the computer 702 through a network interface 736 and then connected via a communication connection 738, which may be wireless.

Network interface 736 encompasses communication networks such as local-area networks (LAN) and wide-area networks (WAN), as well as wireless local-area networks (WLAN) and wireless wide-area networks (WWAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). WLAN technologies include Wi-Fi (802.11), Bluetooth, and similar protocols while WWAN technologies can include long-term evolution (LTE), universal mobile telecommunications system (UMTS), and other similar protocols.

Communication connection 738 refers to the hardware/software employed to connect the network interface 736 to the bus 708. While communication connection 738 is shown for illustrative clarity inside computer 702, it can also be external to the computer 702. The hardware/software for connection to the network interface 736 may include, for exemplary purposes, internal and external technologies such as, mobile phone switches, modems including regular telephone grade modems, cable modems and DSL modems, ISDN adapters, and Ethernet cards.

An example processing unit 704 for the server may be a computing cluster. The disk storage 714 may comprise an enterprise data storage system, for example, holding thousands of impressions.

The computer 702 can be configured to as a service controller and may also enable connection to a service controller. The data 724 may include connection information and an access credential, for example. In another example, the beacon broadcaster, access credential generator, and client connectors may each be modules 722 shown in the computer 702 as well.

One or more of applications 720 may be configured to automate a connection from a client to a service controller. An application may instruct generation of the access credential and access credential hash, as well as the broadcast and communication of these values respectively in order to enable a client to connect to the service controller. The application 720 may provide a Graphical User Interface (GUI) that enables a user to set up a schedule for the generation of time specific access credentials through the addition and manipulation of the data 724. Through the GUI, the user may input a schedule to display or allow access for a particular access credential, in some examples.

The data 724 may include one or more networks listed as connection information. This data 724 may include a name and internet protocol address of a service controller or anther network device that provides access to the service controller. This data may also be ordered in a list such that the network used by the client, if any, is first on the list and may not disconnect the client if the client is already connected to that network. Further, this data 724 may list the memory controller itself as a network to connect too.

In some examples, the user can also display the access credential on the out-of-band communicator such as some version of the output device 730.

After a client obtains the access credential displayed on the same display where data 724 such as content from a connected client may be presented or collaborated on, the client may be granted access to the service controller. Further, the computations executed by the computer 102 to connect to a service controller are described further in relation to FIG. 3.

In some examples, some or all of the processes performed for generating the embossed mesh can be performed in a cloud service and reloaded on the client computer of the user. For example, some or all of the applications described above for embossing the 3D model could be running in a cloud service and receiving input from a user through a client computer. Thus, the calculations involved in computing the embossed 3D model could be performed on a cloud computing system.

EXAMPLE 1

In one example a service controller device includes a processor, a memory to store connection information, an access credential, and an access credential hash. The service controller device further includes a beacon broadcaster to broadcast the connection information and the access credential hash to a client device. Further, the service controller device includes an access credential director to send the access credential to an out-of-band communicator. The example may also include a client connector to allow a client device to access the service controller device based on the client device's use of the connection information. In some examples, service controller device may also include an access credential generator to generate the access credential and the access credential hash, wherein the access credential is received by a user and input into the client device. The out-of-band communicator may be a display. The access credential director may direct the out-of-band communicator to display the access credential to enable receipt of the access credential through a visual channel. In some examples, the connection information may be identified in a client device based on the matching of an access credential to the access credential hash. The service controller may further include an access credential generator located on the service controller to generate the access credential and the access credential hash based on a schedule. In some examples, the service controller includes a networking adaptor to enable the client device to connect to the service controller without passing through a separate network. The access credential director may direct the out-of-band communicator to communicate the access credential through nonvisible means. The beacon broadcaster may additionally broadcast a service controller ID. The connection information may include a name and address for each network that may be used to connect the client device to the service controller. The connection information may also include a number of names and addresses for each network that may be used to connect the client device to the service controller, wherein the number of names and addresses are ordered in a list to encourage connection by any network on which the client is connected. In some examples, the out-of-band communicator may be a display, the service controller may enable the client device to connect to a service module located on the service controller, the service module may manage a client content provided by the client device, and the service controller may enable the client device to display the client content on the out-of-band communicator.

EXAMPLE 2

In one example, a method for enabling discovery of and connection to a service controller includes storing, in a memory of a service controller, connection information, an access credential, and an access credential hash. The method may also include broadcasting connection information and an access credential hash to a client device and communicating an access credential with an out-of-band communicator. The example may allow the client device to access the service controller based on the client device's use of the connection information. In other examples, the method includes identifying the service controller to connect to from a number of access credential hashes by comparing the access credential hash and access credential, wherein each access credential hash represents one of a number of service controllers. In other examples, the out-of-band communicator may be a display, the access credential may be received by a user or the client device and used in the client device to be matched to the access credential hash. The communicating of the access credential may be done by displaying the access credential on the out-of-band communicator to enable the client device to receive the access credential through a visual channel. The connection information may be identified based on the matching of an access credential to the access credential hash. In some examples, the method includes generating the access credential based on a schedule stored in the service controller where the service controller includes a wireless networking adaptor to enable the client device to connect to the service controller without passing through a separate network.

EXAMPLE 3

In one example, a system to enable discovery and connection to a service controller may include an out-of-band communicator and a service controller communicably connected to the out-of-band communicator. In some examples the out-of-band communicator may include a memory of a service controller to store connection information and a beacon broadcaster to broadcast connection information to a client device. The out-of-band communicator may also include a client connector to allow the client device to access the service controller based on the client's use of the connection information. In some examples, the service controller may also store an access credential and an access credential hash while the beacon broadcaster may broadcast the access credential hash to the client device. The access credential director may direct an access credential to the out-of-band communicator. The service controller may also enable the client device to identify the service controller to connect to from a number of access credential hashes by comparing the access credential hash and access credential, wherein each access credential hash represents one of a number of service controllers. In some examples, the access credential may be received by a user and input into the client device to be matched to the access credential hash. In some examples the access credential director may direct the out-of-band communicator to display the access credential to enable the client device to receive the access credential through a visual channel. The connection information may be identified based on the matching of an access credential to the access credential hash. In this example, the system may include an access credential generator located on the service controller to generate the access credential and the access credential hash based on a schedule. The service controller may include a wireless networking adaptor to enable the client device to connect to the service controller without passing through a separate network. In some examples, the connection information includes a name and address for each network that may be used to connect to the service controller.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A service controller device, comprising:
   a processor;
   a memory to store connection information, an access credential, and an access credential hash;
   a beacon broadcaster to broadcast the connection information and the access credential hash to a client device, wherein the connection information comprises a plurality of names and addresses for each network that supports connecting the client device to the service controller device, wherein the plurality of names and addresses are ordered in a list prioritizing any network on which the client device is connected;
   an access credential director to send the access credential to an out-of-band communicator; and
   a client connector to allow a client device to access the service controller device based on the client device's use of the connection information.

2. The service controller device of claim 1, comprising an access credential generator to generate the access credential and the access credential hash, wherein the access credential is received by a user and input into the client device.

3. The service controller device of claim 1, wherein:
   the out-of-band communicator is a display;
   the access credential director directs the out-of-band communicator to display the access credential to enable receipt of the access credential through a visual channel; and
   the connection information is identified in a client device based on the matching of an access credential to the access credential hash.

4. The service controller device of claim 1, comprising an access credential generator located on the service controller device to generate the access credential and the access credential hash based on a schedule.

5. The service controller device of claim 1, wherein the service controller device comprises a networking adaptor to enable the client device to connect to the service controller device without passing through a separate network.

6. The service controller device of claim 1, wherein the access credential director directs the out-of-band communicator to communicate the access credential through nonvisible means.

7. The service controller device of claim 1, wherein the beacon broadcaster additionally broadcasts a service controller ID.

8. The service controller device of claim 1, wherein:
   the out-of-band communicator is a display;
   the service controller device enables the client device to connect to a service module located on the service controller device, wherein the service module manages a client content provided by the client device; and
   the service controller device enables the client device to display the client content on the out-of-band communicator.

9. The service controller device of claim 1, wherein the access credential director is to send the access credential to the out-of-band communicator using an audio signal.

10. A method for enabling discovery of and connection to a service controller device, comprising:
    storing, in a memory of a service controller device, connection information, an access credential, and an access credential hash;
    broadcasting the connection information and the access credential hash to a client device, wherein the connection information comprises a plurality of names and addresses for each network that supports connecting the client device to the service controller device, wherein the plurality of names and addresses are ordered in a list prioritizing any network on which the client device is connected;
    sending the access credential to an out-of-band communicator; and
    allowing the client device to access the service controller device based on the client device's use of the connection information.

11. The method of claim 10, comprising identifying the service controller device to connect to from a plurality of access credential hashes by comparing the access credential hash and access credential, wherein each access credential hash represents one of a plurality of service controller devices.

12. The method of claim 10, wherein:
    the out-of-band communicator is a display;
    the access credential is received by a user or the client device and used in the client device to be matched to the access credential hash;
    the communicating of the access credential is done by displaying the access credential on the out-of-band communicator to enable the client device to receive the access credential through a visual channel; and
    the connection information is identified based on the matching of an access credential to the access credential hash.

13. The method of claim 10, comprising:
    generating the access credential based on a schedule stored in the service controller device; and
    wherein the service controller device comprises a wireless networking adaptor to enable the client device to connect to the service controller device without passing through a separate network.

14. A system to enable discovery and connection to a service controller device, comprising:
    an out-of-band communicator; and
    the service controller device communicably connected to the out-of-band communicator comprising:
    a memory of the service controller device to store connection information, an access credential, and an access credential hash;
    a beacon broadcaster to broadcast the connection information and the access credential hash to a client device, wherein the connection information comprises a plurality of names and addresses for each network that supports connecting the client device to the service controller device, wherein the plurality of names and addresses are ordered in a list prioritizing any network on which the client device is connected;

an access credential director to send the access credential to the out-of-band communicator; and a client connector to allow the client device to access the service controller device based on the client's use of the connection information.

15. The system of claim 14, wherein:

the service controller device also stores an access credential and an access credential hash;

the beacon broadcaster is also to broadcast the access credential hash to the client device;

the access credential director is to direct the access credential to the out-of-band communicator; and the service controller device enables the client device to identify the service controller device to connect to by comparing the access credential hash and the access credential.

16. The system of claim 15, wherein:

the out-of-band communicator is a display;

wherein the access credential is received by a user and input into the client device to be matched to the access credential hash;

the access credential director directs the out-of-band communicator to display the access credential to enable the client device to receive the access credential through a visual channel; and the connection information is identified based on the matching of the access credential to the access credential hash.

17. The system of claim 15, comprising an access credential generator located on the service controller device to generate the access credential and the access credential hash based on a schedule.

18. The system of claim 15, wherein the service controller device comprises a wireless networking adaptor to enable the client device to connect to the service controller device without passing through a separate network.

19. A service controller device, comprising:

a memory to store connection information, an access credential, and an access credential hash;

a beacon broadcaster to broadcast the connection information and the access credential hash to a client device, wherein the connection information comprises a plurality of names and addresses for each network that supports connecting the client device to the service controller device, wherein the plurality of names and addresses are ordered in a list prioritizing any network on which the client device is connected;

an access credential director to send the access credential to an out-of-band communicator;

the out-of-band communicator to broadcast the access credential embedded in a signal; and a client connector to authenticate a client device based on a transmission of the connection information, the access credential, and the access credential hash from the client device to the client connector.

20. The service controller device of claim 19, wherein the access credential director directs the out-of-band communicator to communicate the access credential through nonvisible means.

21. The service controller device of claim 19, wherein:

the out-of-band communicator is a display;

the access credential director directs the out-of-band communicator to display the access credential to enable receipt of the access credential through a visual channel; and the connection information is identified in the client device based on matching the access credential to the access credential hash.

* * * * *